United States Patent [19]
Kadle et al.

[11] Patent Number: 5,146,767
[45] Date of Patent: Sep. 15, 1992

[54] CONDENSER WITH DEHYDRATOR SUBCOOLER

[75] Inventors: Prasad S. Kadle, Getzville; Barry J. Frombgen, Lockport; John P. Telesz, Williamsville, all of N.Y.

[73] Assignee: General Motors Corporation, Detroit, Mich.

[21] Appl. No.: 699,033

[22] Filed: May 13, 1991

[51] Int. Cl.⁵ ............................................. F25B 43/00
[52] U.S. Cl. ..................................... 62/474; 62/507; 62/509
[58] Field of Search .................. 62/509, 474, 506, 507

[56] References Cited
U.S. PATENT DOCUMENTS 4,972,683 11/1990 Beatenbough ..................... 62/509 X
5,038,582 8/1991 Takamatsu ......................... 62/509 X Primary Examiner—William E. Tapolcai
Attorney, Agent, or Firm—Ronald L. Phillips

[57] ABSTRACT

A condenser for a motor vehicle air conditioning system includes an inlet header and an outlet header with a plurality of baffles forming passages for connection to a plurality of parallel tubes to form a plurality of refrigerant flow passes through the condenser and a liquid refrigerant separator device, provided either as a refrigerant dehydrator receiver or as a subcooler tube, is connected across one of the baffles in the outlet header to direct high pressure liquid refrigerant in parallel flow relationship to the plurality of parallel tubes and wherein the separator device includes desiccant to dehydrate the refrigerant flowing through the condenser.

3 Claims, 3 Drawing Sheets

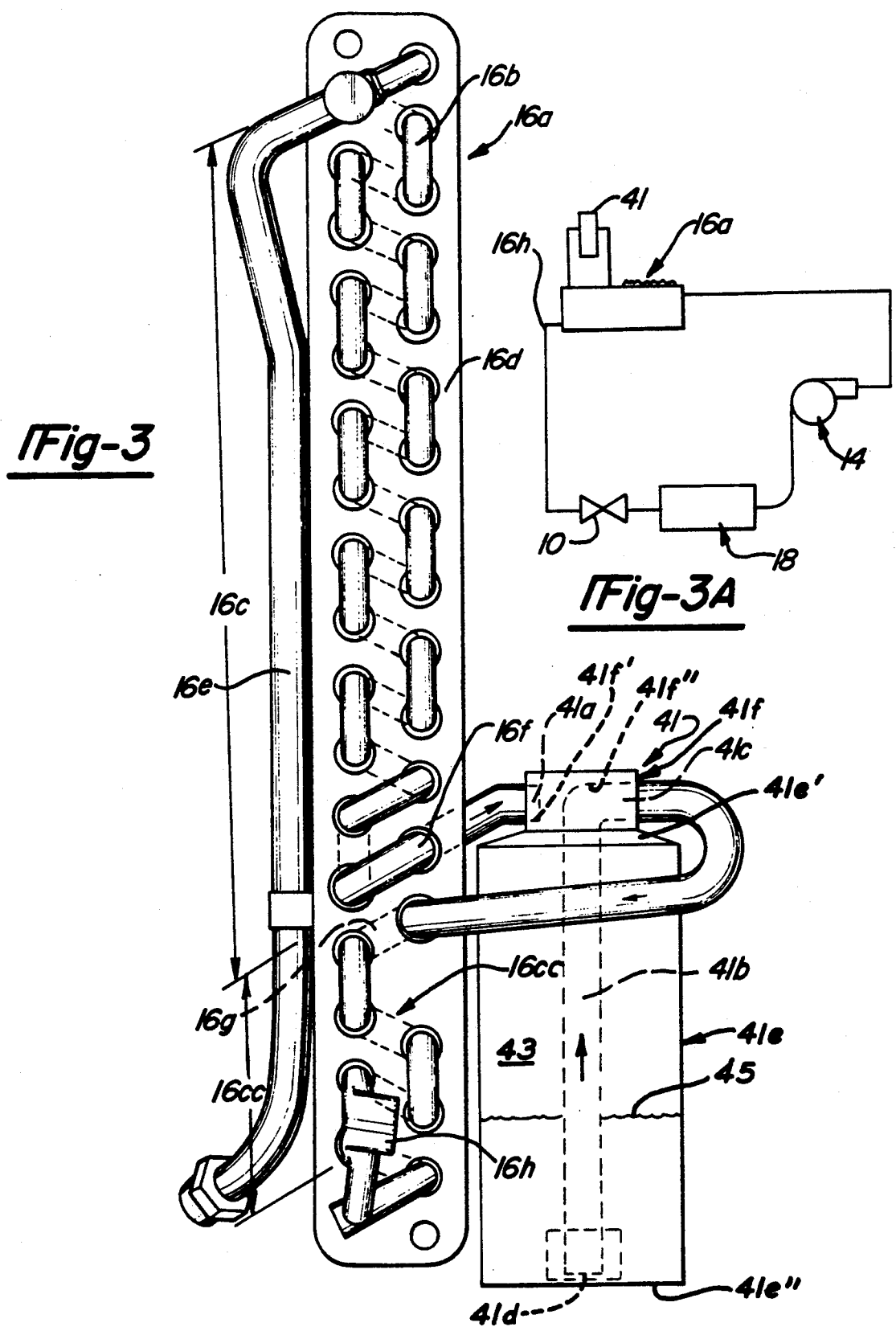

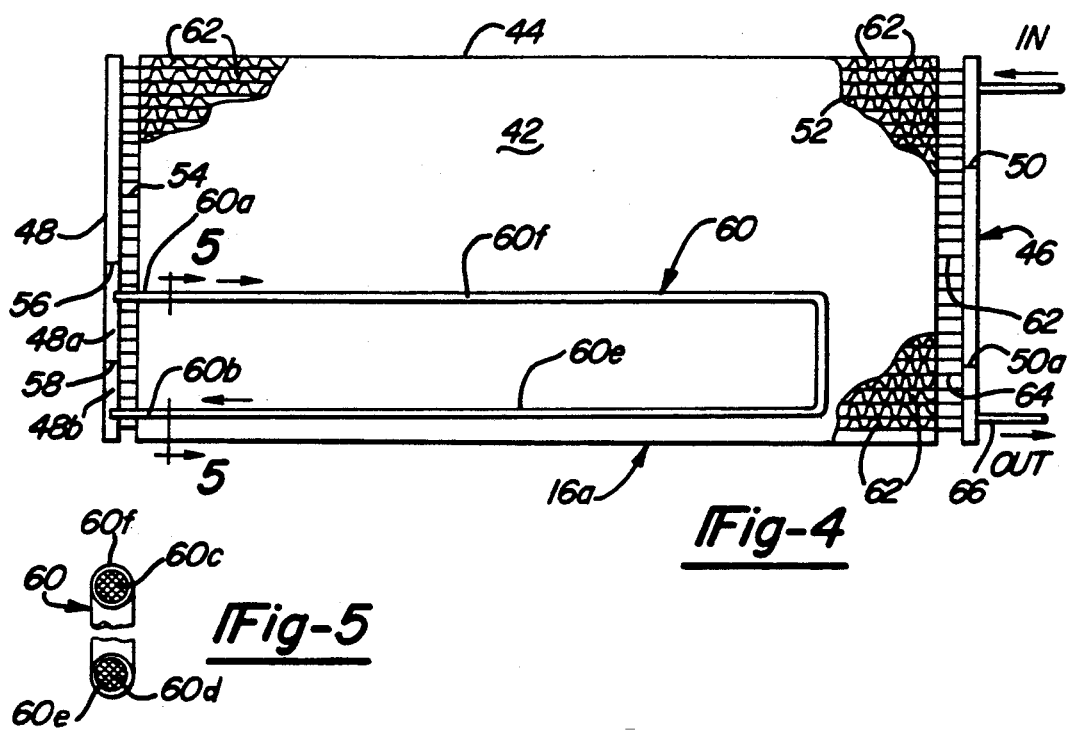
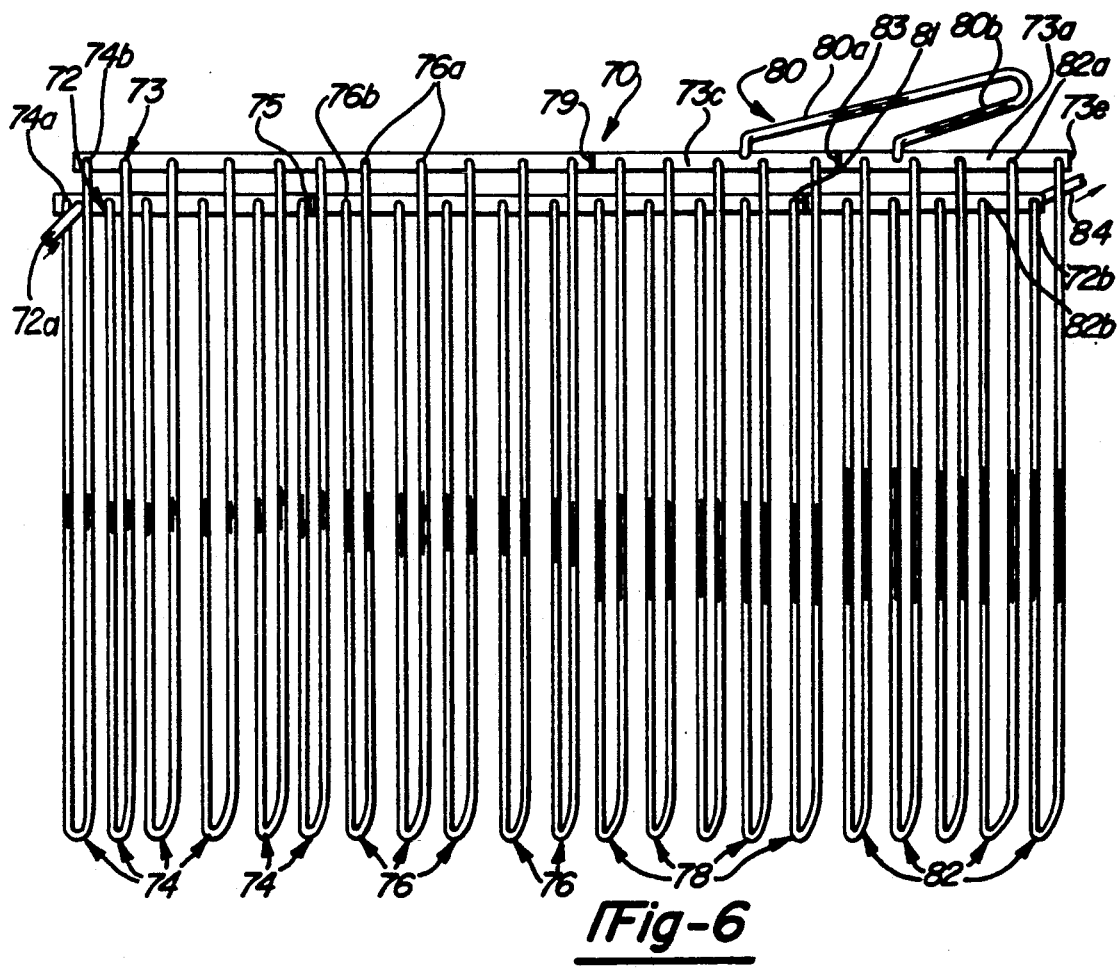

CONDENSER WITH DEHYDRATOR SUBCOOLER

FIELD OF THE INVENTION

This invention relates to refrigerant systems and more particularly to dehydrators for dehydrating refrigerant in refrigerant systems in which high pressure refrigerant vapor is condensed in a heat exchanger as a supercooled high pressure liquid for use in cooling air flow across a downstream evaporator unit.

BACKGROUND OF THE INVENTION

A major problem in the operation of motor vehicle air conditioning systems is that moisture in the form of water vapor is picked-up during operation of the system by migration of water vapor through tubing or seal devices into the refrigerant flowing through the system. In time such moisture can adversely affect the operative components of the system. Several solutions have been proposed in which a separate can type unit is filled with desiccant which removes moisture from the refrigerant as it circulates through the system.

One type of motor vehicle air conditioning system has an engine driven compressor connected to the vehicle engine by a belt pulley drive which includes a cycling clutch controlled to turn the compressor on and off to regulate the refrigerant supply in accordance with the cooling demand. The system has an accumulator on the low pressure refrigerant vapor side of the system. The accumulator is located downstream of the evaporator and includes a chamber filled with desiccant to dehydrate the refrigerant passing through the system.

Another approach to dehydration of refrigerant flow in a motor vehicle air conditioning system is used in systems in which the compressor is driven continuously and the refrigerant flow is controlled by a control valve located between the condenser and the evaporator and responsive to temperature conditions in the system. In such systems a receiver filled with desiccant is located in the high pressure fluid side of the system, usually downstream of the condenser and upstream of the control valve. In cases where there is an inadequate reserve charge of refrigerant, vapor can enter the thermal expansion valve causing a detectable high pitch "hiss" noise as the vapor expands across a valve orifice. The receiver separates vapor from liquid and provides a column of liquid to a thermal expansion control valve. This column of liquid is essential for proper functioning of the flow control valve. In the past, the receiver was located downstream of the condenser. In order to achieve subcooling of the liquid refrigerant, it was necessary to have a sufficient refrigerant charge to fill the receiver with liquid refrigerant which would then back up into the subcooling passes for further cooling.

In such cases, a reserve charge of refrigerant is required. In order to reduce the quantity of reserve charge, the present invention either eliminates or changes the locating of a standard receiver/dehydrator for supplying liquid to the thermal expansion valve.

SUMMARY OF THE INVENTION

The present invention provides a condenser and a liquid separator arranged to collect liquid refrigerant in the passes of a subcooling section of the condenser. The liquid separator served to collect, dry and flood liquid refrigerant into the subcooling section for further cooling. Subcooled liquid is maintained with a reduced refrigerant charge reserve while retaining consistent and quiet operation in a thermal expansion valve.

In one embodiment of the invention, the liquid separator is a standard receiver dehydrator of the type set forth in U.S. Pat. No. 4,111,005, which is commonly assigned to the assignee in this application.

An object of the invention is to provide a standard receiver/dehydrator between the passes of a condenser to provide condenser performance equal to systems with a separate liquid refrigerant receiver downstream of the condenser while maintaining a lesser refrigerant charge in the system while enhancing performance as measured by lower air discharge temperatures from the evaporator because of increased subcooling of liquid refrigerant in the condenser.

Another object is to provide a subcooler in a condenser for an automotive air conditioning refrigerant circuit that includes a subcooler tube filled with desiccant and arranged within the confines of a condenser at a point behind the grille of a motor vehicle and connected in series fluid flow relationship with a plurality of refrigerant passes in the condenser to both cool and dehydrate refrigerant flow through a motor vehicle air conditioning system. In addition to being easily packaged within the confines of the condenser, the subcooler tube provides heat transfer from its outer surface to assist cooling of refrigerant within the condenser.

A further feature of the present invention is to insert a subcooler tube into the parallel tube passes of a condenser upstream of the subcooler pass of the condenser and wherein the subcooler tube is filled with desiccant to dehydrate the refrigerant within the confines of the condenser.

A further feature of the present invention is to provide a heat exchanger having headers with baffles formed therein to form collection spaces for flow of refrigerant through a plurality of parallel tubes forming a plurality of tube passes across the air side of the condenser for cooling high pressure refrigerant vapor and wherein a liquid refrigerant separator is connected across one of the baffles upstream of the outlet of the heat exchanger and wherein the refrigerant separator dehydrates and directs liquid refrigerant into subcooling passes of the condenser including a plurality of parallel tubes forming a subcooled section of the condenser prior to passage from the condenser, whereby a lesser refrigerant reserve is required to assure a consistent supply of liquid refrigerant at a thermal expansion valve, thereby to prevent high frequency valve hissing noises and thereby to maintain lower air discharge temperatures from the evaporator.

Yet another feature of the present invention is to provide a motor vehicle air conditioning system having a low pressure refrigerant vapor side including an evaporator for cooling air flow from a blower and a compressor for compressing low pressure refrigerant vapor from the evaporator and for discharging the refrigerant vapor under pressure into a condenser in a high pressure refrigerant side of the system for condensing high pressure refrigerant vapor into high pressure liquid refrigerant for expansion across an expansion device; the system further includes an improved refrigerant dehydrator located as a refrigerant pass in a condenser having headers with spaced baffles therein forming collection spaces for refrigerant flow through a series of parallel tubes having ends thereof fluidly connected between said passages to form a plurality of refrigerant passes; the dehydrator includes a subcooler tube connected across one of the baffles to cool and direct refrigerant from one of the refrigerant passes to a downstream subcooler refrigerant pass; and the dehydrator further includes desiccant located within the subcooler tube for dehydrating the refrigerant as it is circulated from the high pressure side to the low pressure side of the system.

Still another feature of the invention is to provide a motor vehicle air conditioning system having a low pressure refrigerant vapor side including an evaporator for cooling air flow from a blower and a compressor for compressing low pressure refrigerant vapor from the evaporator and for discharging the refrigerant vapor under pressure into a condenser in a high pressure refrigerant side of the system for condensing the high pressure refrigerant vapor into high pressure liquid refrigerant for expansion across an expansion device; the system including an improved combination receiver dehydrator subcooler tube located solely within the dimensional confines of the condenser and wherein the condenser has first and second header tubes; the first header tube connected to the condenser inlet has at least two spaced baffles therein forming separate collection spaces for refrigerant flow through a first series of parallel tubes having ends thereof fluidly connected to the first header tube to form a plurality of refrigerant passes; the second header tube has at least two spaced baffles therein forming a second series of separate collection spaces for refrigerant flow through a second series of parallel tubes having ends thereof fluidly connected to said second header tube to communicate it with said first series of parallel tubes; the receiver subcooler includes a U-shaped subcooler tube connected across one of the baffles in the second header to receive refrigerant from one of the refrigerant passes for flow to a downstream subcooler refrigerant pass; and desiccant located within the subcooler tube for dehydrating the refrigerant as it is circulated from the high pressure side to the low pressure side of the system.

A further feature of the present invention is to provide the improved receiver subcooler in a condenser in which the first tube has at least two spaced baffles therein forming spaced collection spaces for refrigerant flow through a first series of parallel hair pin tubes each having a bend portion at one end thereof and each having spaced ends; one of the spaces ends thereof fluidly connected between the passages to form a plurality of refrigerant passes; the second tube having at least two spaced baffles therein forming a second series of collection spaces for refrigerant flow through the parallel hair pin tubes; another of the spaced ends of the parallel hair pin tubes fluidly connected between the second series of collection spaces to progressively condense refrigerant vapor to high pressure liquid refrigerant as cooling air flows across the condenser and the parallel hair pin tubes; the combined receiver dehydrator subcooler tube connected across one of the baffles in the second tube to direct refrigerant from one of the refrigerant passes to a subcooler refrigerant pass.

These and other objects, advantages and features of the present invention will become more apparent from the following description and drawings in which:

BRIEF DESCRIPTION OF THE DRAWINGS

FIG. 3 is an end elevational view of one embodiment of the invention;

FIG. 3A is a diagram of the refrigerant system of an automotive air conditioning unit including the embodiment of FIG. 3;

FIG. 4 is a front elevational view of another embodiment of the invention;

FIG. 5 is a fragmentary sectional view taken along line 5—5 of FIG. 4, looking in the direction of the arrows; and FIG. 6 is a front elevational view of a second embodiment of the invention.

DETAILED DESCRIPTION OF PREFERRED EMBODIMENTS OF THE INVENTION

Figure 1:
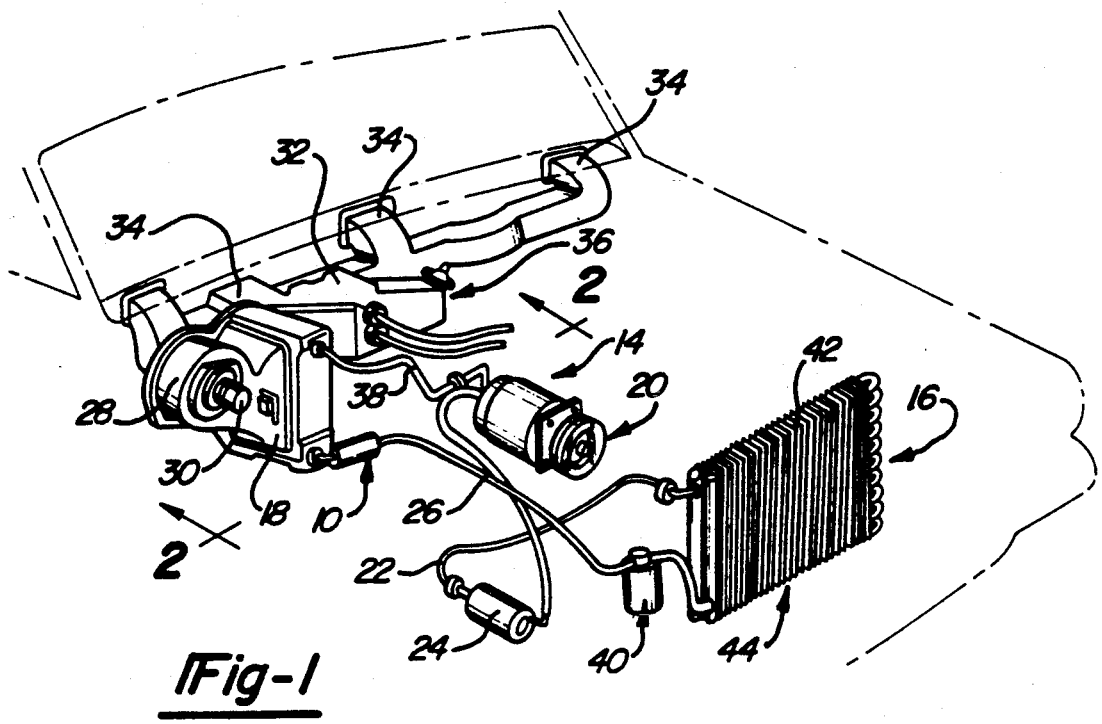
FIG. 1 is a diagrammatic view of an automotive air conditioning system including the condenser and dehydrator of the present invention.

Referring to FIG. 1, a flow control valve 10 is shown installed in an automotive air conditioning system 12. The automotive air conditioning system 12 includes a compressor 14, a condenser 16 and an evaporator 18. The compressor 14 is driven through an electromagnetic clutch 20 by the vehicle engine (not shown) so as to deliver refrigerant as high pressure vapor to the inlet of the condenser 16 in a known manner and is thence discharged as high pressure refrigerant liquid to a high pressure liquid line 26 in which the flow control valve 10 is located. The valve 10 has its outlet connected to the inlet of the evaporator 18. Ambient air is directed across the tubes and fins of the evaporator 18 by a blower fan 28 driven by an electric motor 30. Air cooled by the evaporator is directed from the discharge of the blower fan 28 and is directed into a vehicle passenger compartment through a duct 32 thence through air distribution ports 34 under the control of a mode control system 36.

Low pressure refrigerant vapor exits the evaporator 18 through a suction line 38 and is returned by this line to the suction side of the compressor 14.

Figure 2:
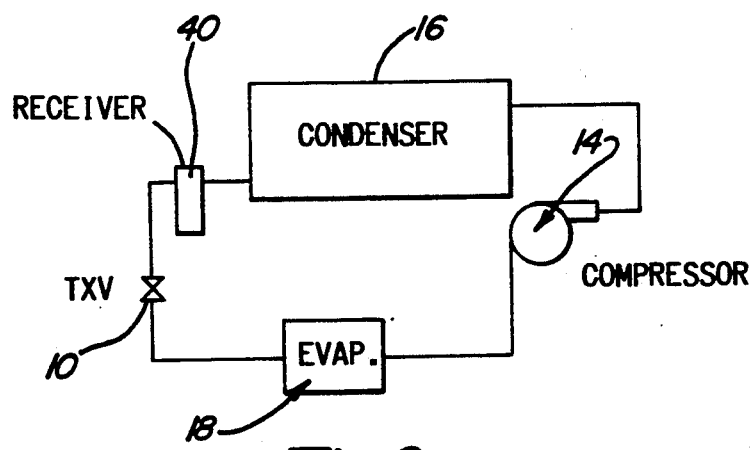
FIG. 2 is a diagram of a prior art receiver dehydrator unit used in a automotive air conditioning system.

In the past, conventional systems, as shown in FIG. 2, have included the thermally responsive control valve 10 and a receiver can 40 connected at the outlet of the condenser 16 to receive high pressure liquid refrigerant from the condenser. The receiver can 40 is a separate component which occupies space outside the confines of the condenser. Usually it is located in the engine compartment between the condenser and the valve 10. The can 40 is filled with desiccant to remove any moisture which migrates into the refrigerant flow through connection lines and compressor shaft seals (not shown) and the like. If the compressor 14 has a limited capacity, which is usually the case, it may not be able to provide enough high pressure refrigerant liquid to the evaporator 18 when the engine is idling. Under such conditions there is little ram air flow across the condenser 16 and the quantity of refrigerant is less since the engine driven compressor 14 is driven at a lower speed. Consequently, the evaporator 18 may run in a less efficient non-flooded condition. In such cases, there can be a high frequency "hiss" noise as vapor passes through the orifice component of the valve 10. The noise is audible.

In the embodiment of FIG. 3, a condenser 16a is shown. It includes condenser tubes 16b arranged in passes defined by parallel tubes 16b' joined by integral return bends 16b" combined to define a serpentine tube pattern forming a condensing section 16c and a subcooling section 16cc. Cooling fins 16d extend across each of the parallel tubes 16b. The fins 16d extract heat from the high pressure refrigerant vapor directed thereto from compressor 14 through in inlet tube 16e. A standard receiver dehydrator 41 has its inlet 41a connected to a tube pass 16f defining an outlet from condenser 16a. A separate downstream tube 16g forms the inlet tube to the passages forming subcooling section 16cc. Liquid refrigerant is collected in the bottom of the receiver. A standpipe 41b has opposite open ends, one of which is connected to an outlet 41c and the other of which is spaced from the lower end 41e" of a container 41e. delivers only the collected liquid refrigerant through an outlet 41c to the passes of the subcooling section 16cc for further cooling of the refrigerant prior to passage thereof through an outlet tube 16h. Tube 16h connects to the thermal expansion valve 10 as shown diagrammatically in FIG. 3A. According to the invention, a lesser refrigerant reserve is required. Only refrigerant at a level above the inlet 41d to the standpipe 41c is required to maintain the subcooling section backfilled with liquid refrigerant. In contrast, when the receiver/dehydrator is located in its standard downstream location shown in FIG. 2, the receiver must be completely filled with liquid refrigerant in order to backfill the subcooling passes, thereby necessitating a greater reserve charge of refrigerant. The container 41e has opposite ends 41e' and 41e"'. An adapter fitting 41f is provided on end 41e'. It includes an adapter inlet 41f' and an adapter outlet 41f". The inlet 41d to the standpipe 41b is located in close spaced relationship to end 41e" within a refrigerant collection space 43 at a point vertically below the inlet 16g so that it is necessary to only have a reserve charge of refrigerant that will fill the small volume of the standpipe 41b in order to assure that the subcooling section 16cc will be backfilled with liquid refrigerant.

In accordance with another aspect of the present invention in the embodiment of FIG. 4, a header/tube type condenser 16a includes a combined receiver dehydrator and subcooler tube 60 located in the frontal air flow area 42 of the condenser 16a and within the outer perimeter 44 of the condenser 16a to produce a greater quantity of moisture dry liquid refrigerant to meet refrigerant flow requirements under both high speed and idle speed operation of the vehicle.

The condenser 16a, more particularly, has first and second headers 46 and 48. The header 46 is connected to an inlet fitting adapted to be connected to the line 22 from compressor 14. The header 46 has a baffle 50 therein which directs the high pressure refrigerant vapor from the compressor 14 through a first plurality of parallel tubes 52 connected to the header 46 upstream of a baffle 50 in header 46. Flow from the tubes 52 pass to header 48 and is returned through a second plurality of parallel tubes 54 to the header 46. In accordance with the invention the header 48 has baffles 56, 58 formed therein across which a combined receiver dehydrator and subcooler tube 60 of the present invention is connected. The combined receiver dehydrator and subcooler tube 60 is arranged such that all the high pressure refrigerant flow through the condenser 16a will pass therethrough between refrigerant chambers 48a, 48b in the header 48 so that refrigerant from the tubes 52, 54 and tubes 62 will flow to an inlet fitting 60a of the subcooler tube 60 and refrigerant from the outlet fitting 60b of subcooler tube 60 will flow into the refrigerant chamber 48b for flow through a subcooler refrigerant pass formed by a plurality of parallel tubes 64 connected below a baffle 50a in header 46 to the outlet end of the header 46 thence to the high pressure liquid refrigerant line 26.

The subcooler tube 60 is filled with desiccant and is located between the tubes in parallel relationship therewith to occupy the same space as the condenser 16 thereby to eliminate the space heretofore occupied by separate receiver dehydrator cans.

The tubes 52, 54, 62, 64 have air centers 62 connected therebetween to define an extended head transfer surface for removing heat from the high pressure refrigerant vapor for condensing the refrigerant to liquid.

In order to increase cooling efficiency, the combination receiver, dehydrator and subcooler tube 60 of the present invention provides heat transfer from its outer surface to increase condensation of refrigerant. The tube 60 can be finned to further increase heat transfer. Fittings 60a, 60b on the subcooler tube 60 are standard refrigerant fittings and the ends of the tube 60 have screens 60c, 60d located therein, as shown in FIG. 5, to hold the desiccant in place.

In operation, the combination receiver, dehydrator and subcooler tube 60 will receive all of the refrigerant flow through the system and will continually dehydrate the refrigerant during operation of the air conditioning system 12. The refrigerant flow through the tube 60 is circulated to run downwardly from the upper leg 60f to the lower leg 60e and thence through chamber 48b to outlet 66 so as to provide a receiver for collecting liquid refrigerant at the outlet from the condenser 16a. More particularly, the tube legs 60e, 60f are arranged so that refrigerant condensed therein will gravity flow into the outlet end of the condenser at the outlet 66 from the condenser 16a.

Referring now to the embodiment of the invention shown in FIG. 6, a condenser 70 is shown having a first header tube 72 and a second header tube 73 in parallel therewith on one side of a 42 (forty-two) tube condenser including 21 (twenty-one) tubes at the front face of the condenser 70 and 21 tubes at the rear face thereof. In this embodiment a first plurality of hair pin tubes 74 have inlet ends 74a thereon communicated with the inlet end 72a of the first header tube 72 upstream of a baffle 75 therein. The outlet ends 74b of each of the hair pin tubes 74 are in turn connected to the second header tube 73. The hair pin tubes 74, as connected, define two refrigerant passes of six tubes each. Suitable air cooling fins (not shown) can be provided between each of the tubes 74 to increase the heat transfer area for conductive cooling of refrigerant therethrough as air flow is directed through the air centers from the front surface to the rear surface of the condenser 70.

The inlet end of the second header tube 73 is connected to one end 76a of a second plurality of hair pin tubers 76 (five in number) each having another end 76b thereof connected to the tube 72 downstream of the baffle 75. Accordingly, the hair pin tubes 76 define a second set of tubes forming third and fourth refrigerant passes also cooled by air flow through the condenser 70. A third plurality of hair pin tubes 78 are connected between the tube 72 and the tube 73 between a baffle 79 in the tube 73 and a second baffle 81 in the tube 72 to form fifth and sixth refrigerant passes cooled by such air flow.

In this embodiment of the invention, the refrigerant condensed in the first through sixth refrigerant passes is then directed through a subcooler tube 80 having an inlet fitting connected to a refrigerant space 73c in the second header tube 73. The space 73c is formed between the baffle 79 and an extra baffle 83 in the header 73 which separates the space 73c from a downstream space 73a in the header 73. In this embodiment the refrigerant space 73c serves as the feed tube for a subcooling section of the condenser 70 defined by a fourth plurality of hair pin tubes 82 having one end 82a thereof connected to the outlet end 73e of the second header tube 73 and the other end 82b thereof connected to the outlet end 72b of the first header tube 72 having the condenser outlet 84 connected thereto. As a consequence, all the refrigerant flow is directed through the subcooler tube 80 from space 73c to space 73a. In order to dehydrate such flow within the confines of the condenser 70, the combined receiver, dehydrator subcooler tube 80 is filled with desiccant with a volume that will hold a requisite amount of desiccant to remove moisture during the lift of the air conditioning system. As in the case of the first embodiment, the subcooler tube 80 is U-shaped and provides heat transfer from its outer surface to complement the cooling action of the above-described eight refrigerant passes. The combined cooling action will provide an improved condensing of high pressure refrigerant vapor to high pressure refrigerant liquid which will be collected in the subcooling passes by gravity flow from the upwardly inclined segments 80a, 80b of the subcooler tube 80 for collection in the outlet end 72b of the first header tube 72 at the outlet 84.

While hair pin type condenser tubes are shown, the invention is equally suitable for use in headered condensers wherein individual tubes have opposite ends connected between baffled headers at opposite ends thereof. In this case the subcooler tube is connected across an extra baffle in the outlet end of the outlet header to dehydrate all the refrigerant flow through the condenser prior to passage thereof through the super cooling section of the condenser.

Having described preferred embodiments of the condenser and dehydrator-subcooler of the present invention, it will be understood by those skilled in the art that the desired operation is obtained within a compact arrangement having few parts that require only slight adjustment of the dimensional form of a standard automotive air conditioning system condenser. In one embodiment, a standard receiver/dehydrator is connected by standard fittings between condensing passes and subcooling passes of the condenser. In the other embodiment, the improved combined receiver dehydrator subcooler tube has a cylindrical shape and size which is available from standard tube mills. It will be understood, however, that the embodiments are illustrative of the invention and may be modified within the scope of the appended claims.

What is claimed is:

1. In a motor vehicle air conditioning system having a low pressure refrigerant vapor side including an evaporator for cooling air flow from a blower and a compressor for compressing low pressure refrigerant vapor from the evaporator and for discharging the refrigerant vapor under pressure into a condenser in a high pressure refrigerant side of the system for condensing the high pressure refrigerant vapor into high pressure liquid refrigerant for expansion across an expansion device connected to the inlet of the evaporator:

said condenser including a series of parallel tubes with return bends joined in a serpentine pattern having two inlets and two outlets; said serpentine pattern forming a plurality of refrigerant passes including a condensing section with an inlet defined by one of said two inlets of said serpentine pattern and with an outlet at one of said two outlets and a refrigerant subcooling section with an inlet defined by the other of said two inlets of said serpentine pattern and with an outlet at the other of said two outlets; and liquid refrigerant separator means connected between said refrigerant passes for backfilling said refrigerant subcooling section with liquid refrigerant;

said liquid refrigerant separator means including a container with opposite ends; an adapter fitting on one of said opposite ends including an adapter inlet and an adapter outlet; said adapter inlet connected to said one of said two outlets; a standpipe located interiorly of said container having opposite open ends thereof; one of said open ends fluidly connected to the other of said two inlets by said adapter outlet and the other of said open ends located in close spaced relationship to the other of said opposite ends; said adapter inlet directing combined liquid and vapor refrigerant into said container and said liquid refrigerant collecting on said other of said opposite ends;

said other of said open ends being located vertically below said other of said two inlets for providing backfilling of said subcooling passes with a lesser reserve charge of refrigerant.

2. A condenser for a motor vehicle air conditioning system having a low pressure refrigerant vapor side including an evaporator for cooling air flow from a blower and a compressor for compressing low pressure refrigerant vapor from the evaporator and for discharging the refrigerant vapor under pressure into a condenser in a high pressure refrigerant side of the system for condensing the high pressure refrigerant vapor into high pressure liquid refrigerant for expansion across an expansion device connected to the inlet of the evaporator:

said condenser including a series of parallel tubes with return bends joined in a serpentine pattern having two inlets and two outlets; said serpentine pattern forming a plurality of refrigerant passes including a condensing section with an inlet defined by one of said two inlets of said. serpentine pattern and with an outlet at one of said two outlets and a refrigerant subcooling section with an inlet defined by the other of said two inlets of said serpentine pattern and with an outlet at the other of said two outlets;

liquid refrigerant separator means connected between said refrigerant passes for backfilling said refrigerant subcooling section with liquid refrigerant;

said liquid refrigerant separator means including a container with opposite ends; an adapter fitting on one of said opposite ends including an adapter inlet and an adapter outlet; said adapter inlet connected to said one of said two outlets; a standpipe located interiorly of said container having opposite open ends thereon; one of said open ends fluidly connected to the other of said two inlets by said adapter outlet and the other of said open ends located in close spaced relationship to the other of said opposite ends; said adapter inlet directing combined liquid and vapor refrigerant into said container and said liquid refrigerant collecting on said other of said opposite ends;

said other of said open ends being located vertically below said other of said two inlets for providing backfilling of said subcooling passes with a lesser reserve charge of refrigerant; and a desiccant located within said liquid refrigerant separator means for dehydrating the refrigerant as it is circulated from the high pressure side to the low pressure side of the system.

3. In a motor vehicle air conditioning system having a low pressure refrigerant vapor side including an evaporator for cooling air flow from a blower and a compressor for compressing low pressure refrigerant vapor from the evaporator and for discharging the refrigerant vapor under pressure into a condenser in a high pressure refrigerant side of the system for condensing the high pressure refrigerant vapor into high pressure liquid refrigerant for expansion across an expansion device connected to the inlet of the evaporator:

said condenser having a first set of parallel tubes fluidly connected to form a condensing section having an inlet and an outlet;

said condenser having a second set of parallel tubes fluidly connected to form a subcooling section having an inlet and an outlet;

a receiver/dehydrator having opposite ends and an inlet and outlet at one of said opposite ends; said receiver/dehydrator further including a refrigerant collections pace for receiving refrigerant from said last mentioned inlet for separating liquid refrigerant from refrigerant vapor; a standpipe with an inlet located adjacent the other of said opposite ends and communicating with said collection space for flow of liquid refrigerant to said last mentioned outlet;

said standpipe inlet located vertically below said last mentioned inlet and said inlet to said subcooling section for providing backfilling of said subcooling passes with a lesser reserve charge of refrigerant.

* * * * *